United States Patent
Joko

(10) Patent No.: US 9,736,753 B2
(45) Date of Patent: Aug. 15, 2017

(54) CONTROL APPARATUS AND COMMUNICATION CONTROL METHOD

(71) Applicant: KYOCERA CORPORATION, Kyoto (JP)

(72) Inventor: Shingo Joko, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 54 days.

(21) Appl. No.: 14/378,473

(22) PCT Filed: Feb. 15, 2013

(86) PCT No.: PCT/JP2013/053750
§ 371 (c)(1),
(2) Date: Aug. 13, 2014

(87) PCT Pub. No.: WO2013/122228
PCT Pub. Date: Aug. 22, 2013

(65) Prior Publication Data
US 2015/0023273 A1 Jan. 22, 2015

(30) Foreign Application Priority Data

Feb. 16, 2012 (JP) .................................. 2012-032145

(51) Int. Cl.
*H04W 40/04* (2009.01)
*H04W 40/02* (2009.01)
(Continued)

(52) U.S. Cl.
CPC ............. *H04W 40/04* (2013.01); *H04L 67/10* (2013.01); *H04W 4/008* (2013.01); *H04W 40/02* (2013.01)

(58) Field of Classification Search
CPC ..... H04W 40/02; H04W 40/04; H04W 4/008; H04L 67/10
See application file for complete search history.

(56) References Cited

U.S. PATENT DOCUMENTS

2004/0105420 A1\* 6/2004 Takeda .............. H04L 29/12066
370/349
2005/0227719 A1\* 10/2005 Gunaratnam ......... H04W 48/18
455/510

(Continued)

FOREIGN PATENT DOCUMENTS

JP  2005-159670 A  6/2005
JP  2006-245854 A  9/2006

(Continued)

OTHER PUBLICATIONS

Concise Explanation of Office Action dated Jul. 7, 2015 issued in counterpart Japanese application No. 2013-558760.

(Continued)

*Primary Examiner* — Anez Ebrahim
(74) *Attorney, Agent, or Firm* — Procopio, Cory, Hargreaves & Savitch LLP

(57) ABSTRACT

A HEMS constituting a ZigBee network with at least one of equipment, comprises a processing unit processing an application to control the equipment, and a ZigBee control unit managing route information by each of the equipment according to a ZigBee protocol. The processing unit selects one of either a first mode or a second mode in accordance with the number of the equipment included in the ZigBee network, In the first mode, notification of the equipment to be controlled is sent from the processing unit to the ZigBee control unit, and the ZigBee control unit controls communication route to the equipment to be controlled. In the second mode, the processing unit decides the communication route to the equipment to be controlled, and notification of the communication route is sent from the processing unit to the ZigBee control unit.

13 Claims, 6 Drawing Sheets

(51) Int. Cl.
H04L 29/08 (2006.01)
H04W 4/00 (2009.01)

(56) References Cited

U.S. PATENT DOCUMENTS

| | | | |
|---|---|---|---|
| 2011/0153107 A1 | 6/2011 | Kim et al. | |
| 2012/0201210 A1* | 8/2012 | An | H04M 1/7253 370/329 |
| 2013/0064089 A1* | 3/2013 | Wu | H04W 28/0289 370/235 |

FOREIGN PATENT DOCUMENTS

| | | |
|---|---|---|
| JP | 2008-047984 A | 2/2008 |
| JP | 2011-129085 A | 6/2011 |

OTHER PUBLICATIONS

International Search Report; PCT/JP2013/053750; Apr. 16, 2013.
Office Action dated Jul. 7, 2015 issued in counterpart Japanese application No. 2013-558760.

* cited by examiner

US 9,736,753 B2

CONTROL APPARATUS AND COMMUNICATION CONTROL METHOD

TECHNICAL FIELD

The present invention relates to a control apparatus constituting an autonomous distributed radio network with at least one of equipment and a communication control method.

BACKGROUND ART

In recent years, interest in energy saving increases and an Energy Management System (EMS) is getting a lot of attention as a control apparatus to perform power management by the power consumer. The control apparatus to perform the power management by the house is called as a Home Energy Management System (HEMS).

The EMS communicates with the equipment such as a distributed power source, a home electric appliance, and a sensor provided in the consumer using a short-range communication network (PAN: Personal Area Network) provided in the consumer.

Such a short-range communication network does not depend on an infrastructure network, that is, an autonomous distributed radio network. A ZigBee (ZigBee (registered trademark)) is known as one of communication protocols to realize this network (for example, see Patent Literature 1).

In ZigBee, a physical layer (PHY layer) and a Mac layer apply IEEE802.15.4, and a network layer (NWK layer) and an application support sub-layer (APS layer) apply a protocol formulated in ZigBee Alliance (a ZigBee protocol).

Further, in a ZigBee network, a device managing the network is called as a ZigBee coordinator (ZC), a relaying (routing) device is called as a ZigBee router (ZR) and an end device is called as a ZigBee end device (ZED). Therefore, the EMS comprises a ZigBee module corresponding to the ZC, each of the equipment such as the distributed power source, the home electric appliance, and a sensor comprises the ZigBee module corresponding to the ZR or the ZED.

CITATION LIST

Patent Literature

[PTL 1] Japanese Unexamined Patent Application Publication No. 2011-129085

SUMMARY OF INVENTION

The ZigBee module corresponding to the ZC and the ZR manages route information by each of the equipment included in the ZigBee network as a routing table (routing table). Since the number of the equipment included in the ZigBee network is 65536 at the maximum on a specification, the ZigBee module corresponding to the ZC and the ZR manages route information for 65536 pieces of the equipment at the maximum.

However, since resources (memory capacity, etc.) for the routing table are limited in the ZigBee module, it is difficult for the ZigBee module to manage such a large amount of the route information.

Accordingly, conventionally, there is a problem that a route control is not able to be properly performed in the case that the number of the equipment included in the radio network is large in the radio network such as the ZigBee network.

Therefore, an object of the present invention is to provide the control apparatus capable of properly performing the route control even in the case that the number of the equipment included in the radio network is large, and a communication control method.

A control apparatus of the present invention is characterized in that the control apparatus constituting an autonomous distributed radio network with at least one of equipment, comprises an application processing unit processing an application to control the equipment, and a communication control unit managing route information by each of the equipment according to a prescribed communication protocol positioned in a lower layer than the application, the application processing unit selects one of either a first mode or a second mode in accordance with the number of the equipment included in the radio network, in the first mode, notification of the equipment to be controlled is sent from the application processing unit to the communication control unit, and the communication control unit controls communication route to the equipment to be controlled, and in the second mode, the application processing unit decides the communication route to the equipment to be controlled, and notification of the communication route is sent from the application processing unit to the communication control unit.

When the number of the equipment included in the radio network is equal to or less than a threshold determined in accordance with an upper limit number of the route information capable of being managed by the communication control unit, the application processing unit may select the first mode, when the number of the equipment included in the radio network is more than the threshold, the application processing unit may select the second mode.

The threshold may be a value resulting from adding a prescribed offset value to an upper limit number of the route information capable of being managed by the communication control unit.

In the case that the first mode is selected, when the communication control unit does not have the route information corresponding to the equipment to be controlled, the communication control unit may perform route resolution to acquire the route information corresponding to the equipment to be controlled, and in the case that the communication control unit performs the route resolution, the application processing unit may set a first timeout period to fix a time limit for the route resolution.

In the case that the communication control unit performs the route resolution, when the route resolution is completed within the first timeout period, the application processing unit may perform a transmission request to the equipment to be controlled, to the communication control unit and may set a second timeout period to fix a time limit for a response from the equipment to be controlled.

In the case that the first mode is selected, the application processing unit may determine whether the communication control unit has the route information corresponding to the equipment to be controlled, the application processing unit makes the communication control unit perform the route resolution when determined that the communication control unit may not have the route information corresponding to the equipment to be controlled.

The radio network may be a ZigBee network.

A communication control method of the present invention is characterized in that the communication control method is applied to a control apparatus constituting an autonomous distributed radio network with at least one of equipment, the control apparatus includes an application processing unit processing an application to control the equipment, and a communication control unit managing route information by each of the equipment according to a prescribed communication protocol positioned in a lower layer than the application, the communication control method comprises a step of selecting one of either a first mode or a second mode in accordance with the number of the equipment included in the radio network by the application processing unit, in the first mode, notification of the equipment to be controlled is sent from the application processing unit to the communication control unit, and the communication control unit controls communication route to the equipment to be controlled, and in the second mode, the application processing unit decides the communication route to the equipment to be controlled, and notification of the communication route is sent from the application processing unit to the communication control unit.

A communication control method of the present invention is characterized in that the communication control method is applied to a control apparatus constituting a ZigBee network comprises each process for deciding a communication route to a transmitting destination node is different in case that the number of the equipment 200 (node) included in the ZigBee network 10 is large and in case that the number is small when data is transmitted.

According to the present invention, it is possible to provide a control apparatus capable of properly performing route control even in the case that the number of equipment included in a radio network is large, and a communication control method.

DESCRIPTION OF EMBODIMENTS

Figure 1:
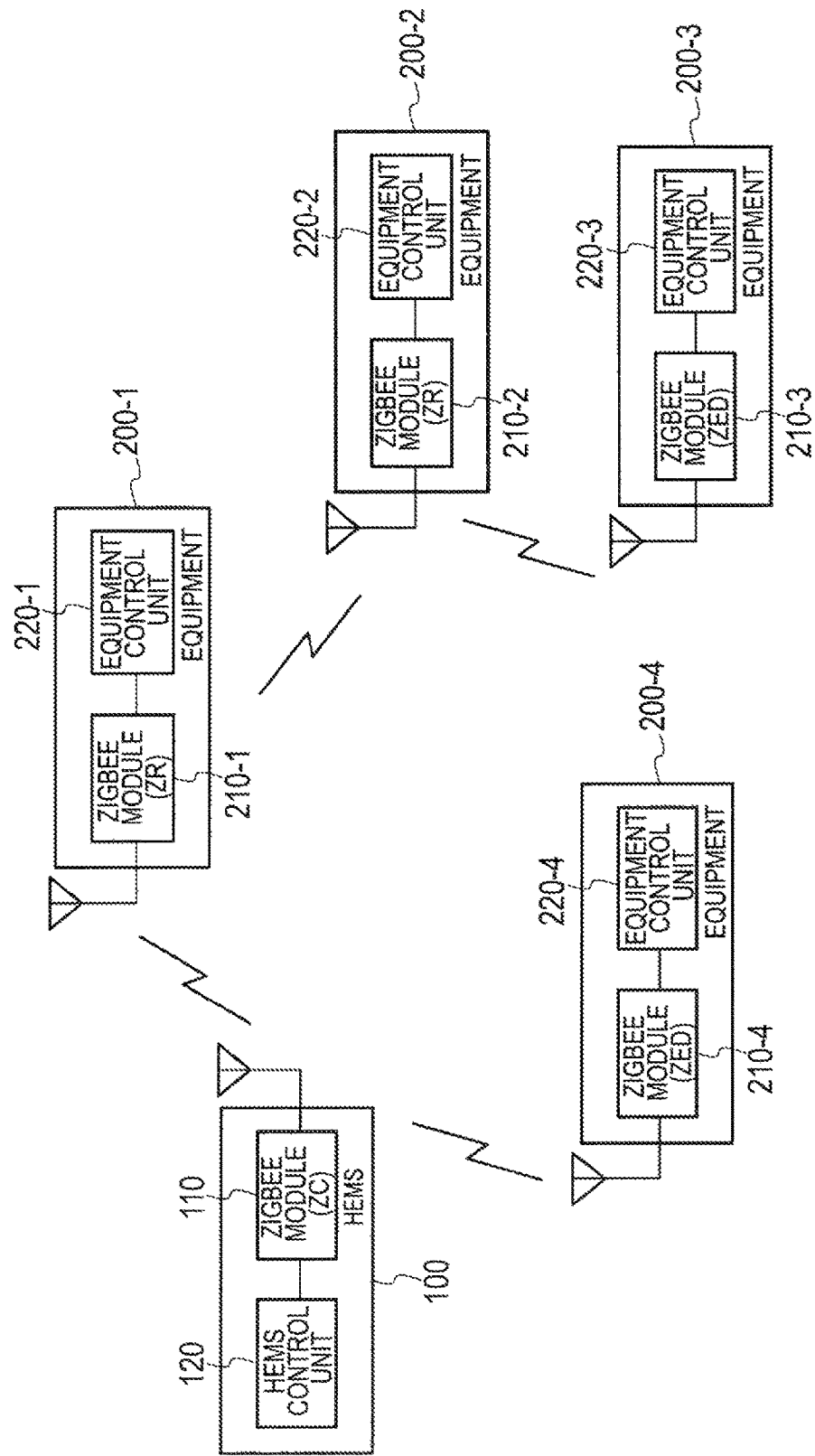
FIG. 1 is an overall structure diagram of a ZigBee network according to the present embodiment.

With reference to drawings, an embodiment of the present invention will be described in the order of (1) an overall structure, (2) a protocol stack, (3) a structure of the HEMS, (4) an operation, (5) a summary, and (6) other embodiments. In the drawings according to an embodiment and an example below, identical or similar symbols are assigned to identical or similar portions.

(1) An Overall Structure

FIG. 1 is an overall structure diagram of a ZigBee network 10 according to the present embodiment.

As shown in FIG. 1, a ZigBee network 10 according to the present embodiment is composed of a HEMS 100 and a plurality of equipment 200. In FIG. 1, a plurality of the equipment 200 is illustrated as 4 pieces of the equipment 200-1 to 200-4. However, each of the equipment 200 composing the ZigBee network 10 is capable of connect 65535 pieces of the equipment 200 (including the HEMS 100, 65536 devices) within 1 network because the equipment 200 has a 64 bit address unique to equipment and a 16 bit address used within the network.

The HEMS 100 and a plurality of the equipment 200 is provided in a house. The HEMS 100 is corresponding to a control apparatus to perform the power management per house. For example, the equipment 200 is a distributed power source, a home electric appliance, a sensor provided in the house or the like.

The HEMS 100 communicates with a plurality of the equipment 200 and controls this equipment 200. The HEMS 100 comprises a ZigBee module 110 and a HEMS control unit 120. The ZigBee module 110 is corresponding to a ZC performing network management of the ZigBee network 10. Further, the ZigBee module 110 performs radio communication with the adjacent equipment 200-1 and 200-4. The HEMS control unit 120 runs a HEMS application. The HEMS application communicates with the equipment 200 using the ZigBee module 110 and control the equipment 200. For example, if the equipment 200 is an air conditioner, the HEMS application controls the preset temperature of the air conditioner and if the equipment 200 is the sensor, the HEMS application makes the sensor report a value measured by the sensor.

Each of a plurality of the equipment 200 comprises a ZigBee module 210 and an equipment control unit 220. Structures of the equipment 200-1-200-4 will be described in order below.

The equipment 200-1 comprises the ZigBee module 210-1 and the equipment control unit 220-1. The ZigBee module 210-1 is corresponding to a ZR performing routing in the ZigBee network 10. Further, the ZigBee module 210-1 performs radio communication with the adjacent HEMS 100 and the adjacent equipment 200-2. The equipment control unit 220-1 runs an equipment application. The equipment application communicates with the HEMS 100 using the ZigBee module 210-1 and makes the equipment 200-1 operate according to the control by the HEMS 100.

The equipment 200-2 comprises the ZigBee module 210-2 and the equipment control unit 220-2. The ZigBee module 210-2 is corresponding to the ZR performing routing in the ZigBee network 10. Further, the ZigBee module 210-2 performs radio communication with the adjacent equipment 200-1 and 200-3. The equipment control unit 220-2 runs the equipment application. The equipment application communicates with the HEMS 100 using the ZigBee module 210-2 and makes the equipment 200-2 operate according to the control by the HEMS 100.

The equipment 200-3 comprises the ZigBee module 210-3 and the equipment control unit 220-3. The ZigBee module 210-3 is corresponding to a ZED which is an end device. Further, the ZigBee module 210-3 performs radio communication with the adjacent equipment 200-2. The equipment control unit 220-3 runs the equipment application. The equipment application communicates with the HEMS 100 using the ZigBee module 210-3 and makes the equipment 200-3 operate according to the control by the HEMS 100.

The equipment 200-4 comprises the ZigBee module 210-4 and the equipment control unit 220-4. The ZigBee module 210-4 is corresponding to the ZED which is the end device. Further, the ZigBee module 210-4 performs radio communication with the adjacent HEMS 100. The equipment control unit 220-4 runs the equipment application. The equipment application communicates with the HEMS 100 using the ZigBee module 210-4 and makes the equipment 200-4 operate according to the control by the HEMS 100.

(2) A Protocol Stack

The ZigBee network 10 applies IEEE 802. 15. 4 for a PHY layer and a Mac layer and a protocol designed by ZigBee Alliance (a ZigBee protocol) for a NWK layer and an APS layer.

The PHY layer and the Mac layer conforming to IEEE 802. 15. 4 and the NWK layer and the APS layer conforming to the ZigBee protocol are implemented on each of the ZigBee module 110 and 210. By contrast, an application capable of being defined by a user (APP layer) is implemented on the HEMS control unit 120 and the equipment control unit 220

The APP layer includes the application and a middleware. Further, the APP layer is applied to a profile in accordance with use cases. In the present embodiment, a HA (Home Automation) profile is applied to the APP layer. A format of the HA profile is specified in ZCL (ZigBee (registered trademark) Cluster Library) and the application transmits and receives data of the format in accordance with ZCL between the application of a communication destination.

Figure 2:
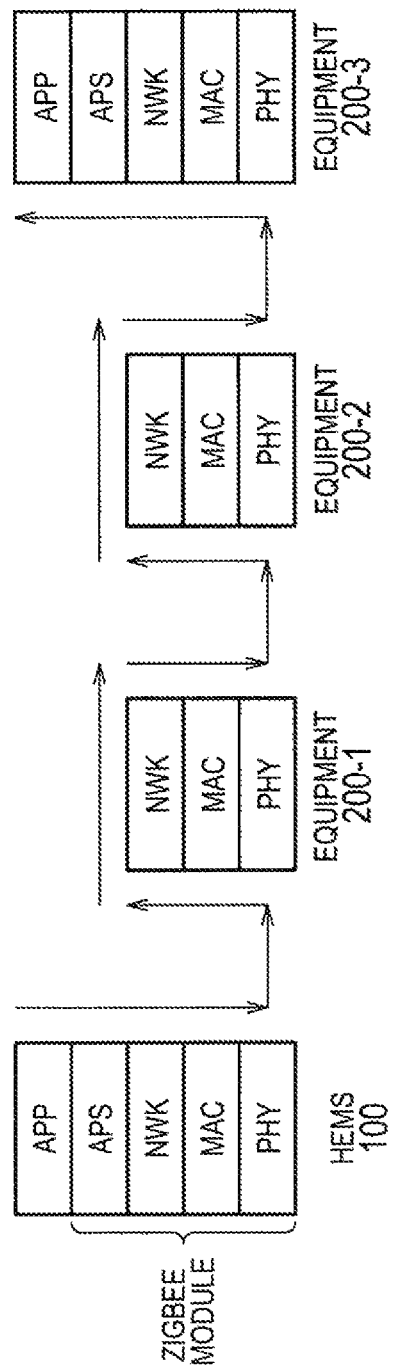
FIG. 2 is a protocol stack diagram in a ZigBee network according to the present embodiment.

FIG. 2 is a protocol stack diagram in the ZigBee network 10.

A method for the NWK layer performing the route control (first mode) according to the present embodiment will be described below.

First, a route control (routing) of the ZigBee network 10 when the data is transferred from the HEMS 100 to the equipment 200-3 via the equipment 200-1 and equipment 200-2 will be described.

As shown in FIG. 2, the APP layer (HEMS application) of the HEMS 100 designates a destination of the data (destination address) and performs a transmission request to the APS layer. A header is added to the data in the APS layer and the data is given to the NWK layer.

The NWK layer manages route information of each node (the equipment 200) included in the ZigBee network 10 as a routing table. Now, the route information is information to transfer data addressed to the equipment 200 to an appropriate node and is information mapping an address of a transfer destination node on an address of the equipment 200, for example. When the NWK layer receives the data with address of the equipment 200-3 as a destination, the NWK layer controls a lower layer (the Mac layer) so as to transmit the data to the equipment 200-1 by referring to the route information.

The Mac layer receives the data from the NWK layer, adds the data to the header and gives the data to the PHY layer. Then, when the PHY layer receives the data from the Mac layer, the PHY layer transmits the data by radio.

The PHY layer of the equipment 200-1 receives the data from the PHY layer of the HEMS 100 by radio and gives the data to the Mac layer. The Mac layer gives the data received from the PHY layer to the NWK layer.

The NWK layer manages the route information of each of the node (the equipment 200) included in the ZigBee network 10 as the routing table. When the NWK layer receives the data with address of the equipment 200-3 as a destination, the NWK layer controls a lower layer (the Mac layer) so as to transmit the data to the equipment 200-2 by referring to the route information.

The Mac layer receives the data from the NWK layer, adds the data to the header and gives the data to the PHY layer. Then, when the PHY layer receives the data from the Mac layer, the PHY layer transmits the data by radio.

In the equipment 200-2, the equipment 200-2 transmits the data to the equipment 200-3 by radio after the same processes as in the equipment 200-1 are also performed.

The PHY layer of the equipment 200-3 receives the data from the PHY layer of the equipment 200-3 by radio and gives the data to the Mac layer. The Mac layer gives the data received from the PHY layer to the NWK layer.

The NWK layer recognizes that the destination of data received from the Mac layer is the own equipment 200-3 and gives the data to an upper layer (APS layer). The APS layer gives the data received from the NWK layer to the APP layer. Then, the APP layer (an equipment application) interprets the data received from the APS layer and performs processing corresponding to the data.

In this way, the route control (routing) in the ZigBee network 10 is mainly performed in the NWK layer. However, the ZigBee module controlling the NWK layer has an upper limit number of the route information capable of being managed. If the application designates the destination (node) which is not included in the routing table, the route resolution is performed before transmission.

Then, a method for which the APP layer (the HEMS application) of the HEMS 100 performs the route control (a second mode) will be described in the present embodiment.

In the second mode, the APP layer (the HEMS application) of the HEMS 100 manages information on entire communication route (hereinafter referred to as "entire route information"). For example, the entire route information on equipment 200-3 includes the address of the entire equipment 200 (the node) and the address of equipment 200 itself in the halfway route in order of each node of the equipment 200-1, the equipment 200-2, and the equipment 200-3. The address of the equipment 200 may be an IP address of the equipment 200 or network address (PAN ID defined by the ZigBee protocol) assigned to the equipment 200.

The APP layer of the HEMS 100 (the HEMS application) performs the transmission request to the APS layer, extracts the communication route on the equipment 200-3 from entire route information and gives it to the APS layer in case that the APP layer performs transmission to the equipment 200-3. In this case, the NWK layer determines the node to be transferred according to the communication route designated by the HEMS application.

However, in the second mode, it is necessary to constantly grasp the route to the entire equipment 200 in the HEMS application and continue to update the entire route information for grasping it. For example, the HEMS application continues to update the entire route information on the entire equipment 200 by broadcasting a route request command on the entire equipment 200 periodically.

(3) A Structure of the HEMS

Figure 3:
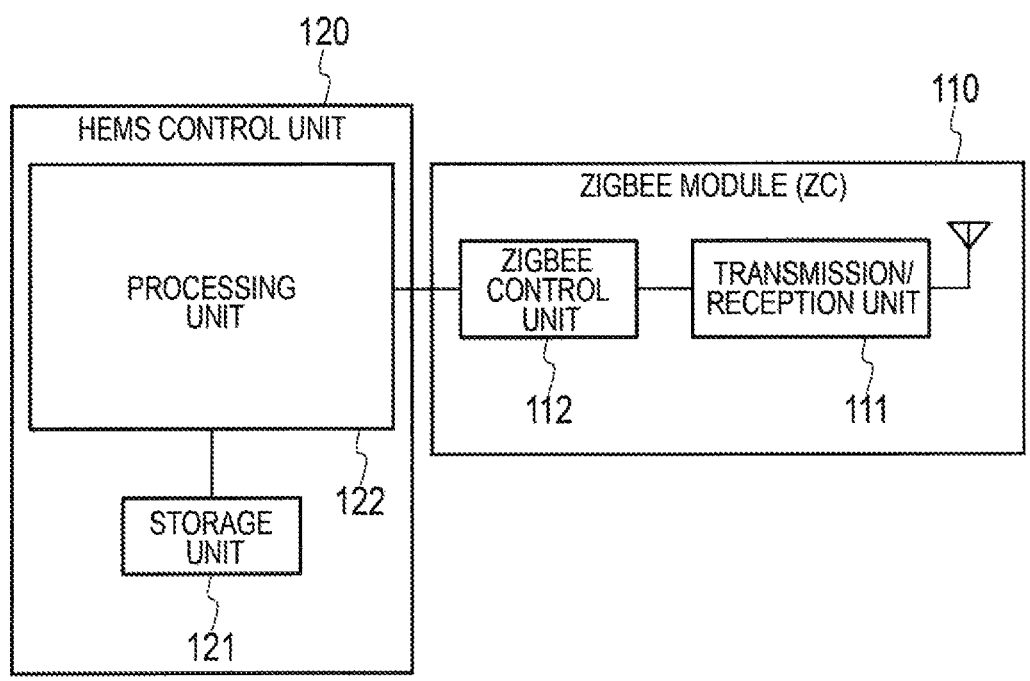
FIG. 3 is a block diagram of a HEMS according to the present embodiment.

Then, the structure of the HEMS 100 will be described. FIG. 3 is a block diagram of the HEMS 100.

As shown in FIG. 3, the HEMS 100 comprises a ZigBee module 110 and a HEMS control unit 120. The ZigBee module 110 includes a transmission/reception unit 111 and a ZigBee control unit 112. The HEMS control unit 120 includes a storage unit 121 and a processing unit 122.

Function of the above-mentioned PHY layer is implemented on the transmission/reception unit 111. The transmission/reception unit 111 transmits and receives radio signal in accordance with IEEE 802. 15. 4.

Respective functions such as the above-mentioned Mac layer, NWK layer and APS layer is implemented on the ZigBee control unit 112.

The ZigBee control unit 112 includes the processor, the memory, and like that. The memory stores the above-mentioned routing table. In the present embodiment, the ZigBee control unit 112 is corresponding to the communication control unit managing the route information by each of the equipment 200 according to the ZigBee protocol positioned the lower layer than the application.

The storage unit 121 includes the memory and the HDD, for example, and stores a program (the application and the middleware) run by the processing unit 122. Further, in the second mode, the storage unit 121 stores the entire route information of each of equipment 200.

The processing unit 122 includes a processor, for example, and runs a program stored in the storage unit 121 (the application and the middleware). In the present embodiment, the processing unit 122 is corresponding to an application processing unit processing the application to control the equipment 200.

The processing unit 122 selects one of either a first mode or a second mode in accordance with the number of the equipment 200 (the node) included in the ZigBee network 10. In the first mode, notification of the equipment to be controlled is sent from the processing unit 122 to the communication control unit ZigBee control unit 112, and the ZigBee control unit 112 controls the communication route to the equipment 200. In the second mode, the processing unit 122 decides the communication route to the equipment 200 to be controlled, and notification of the communication route is sent from the processing unit 122 to the ZigBee control unit 112.

The processing unit 122 may be the number of the equipment 200 included in the ZigBee network 10 in place of the number of the route information included in the routing table managed by the ZigBee control unit 112. Otherwise, the processing unit 122 may be conditional on grasping the number of the equipment 200 to be controlled (and the number of the ZigBee module) and may be the number of the equipment 200 included in the ZigBee network 10 in place of the grasped number.

When the number of the equipment 200 included in the ZigBee network 10 is equal to or less than a threshold determined in accordance with the upper limit number of the route information capable of being managed (held) by the ZigBee control unit 112, the processing unit 122 selects the first mode. By contrast, when the number of the equipment 200 included in the ZigBee network 10 is more than the threshold, the processing unit 122 selects the second mode. Here, the upper limit number of the route information capable of be managed by the ZigBee control unit 112 (hereinafter referred to simply as "the upper limit number of the route information") is set beforehand according to a performance (e.g. capacity of memory and like that) of the ZigBee control unit 112.

Further, the threshold may be a value resulting from adding a prescribed offset value a to the upper limit number of the route information. However, if the threshold is a value resulting from adding the prescribed offset value a to the upper limit number of the route information, there is no route information on a small number of the equipment in the routing table in the first mode. Therefore, when the processing unit 122 designates a small number of the equipment 200 as the destination, the ZigBee control unit 112 performs the route resolution before transmitting.

According to the present embodiment, in the first mode, when the ZigBee control unit 112 performs the route resolution, the processing unit 122 sets a timeout period for route resolution Tr for fixing a term of the route resolution. Further, in case that timeout occurs because the route resolution is not completed within timeout period for route resolution Tr, the processing unit 122 performs the processing in timeout (e.g. retransmission processing or error determination processing).

Further, in case that the ZigBee control unit 112 performs the route resolution, when the route resolution is completed within the timeout period for route resolution Tr, the processing unit 122 performs a transmission request to the equipment 200 to be controlled to the ZigBee control unit 112 and sets a timeout period for a response Ts for fixing a term of the response from the equipment 200. If the timeout occurs because the response is not acquired within the timeout period for a response Ts, the processing unit 122 performs the processing in timeout (e.g. retransmission processing or error determination processing).

(4) An Operation

An operation of the ZigBee network 10 will be described in a view point of an operation of the HEMS 100 below.

(4. 1) A Mode Selection Operation

Figure 4:
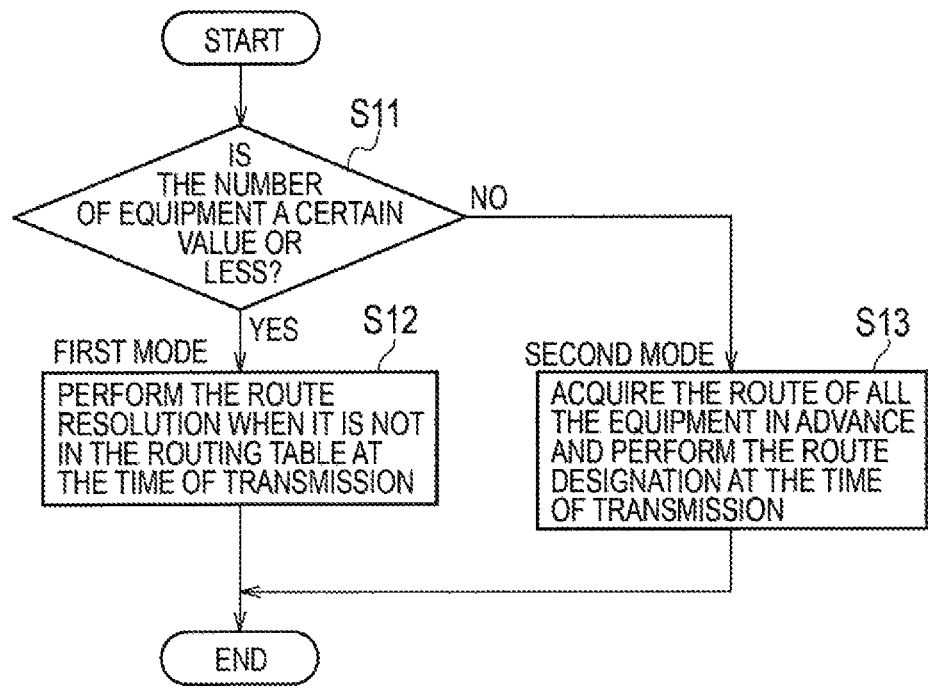
FIG. 4 is a flowchart of a mode selection operation by a HEMS according to the present embodiment.

FIG. 4 is a flowchart of a mode selection operation by the HEMS 100.

As shown in FIG. 4, in step S11, the processing unit 122 compares the number of the equipment 200 included in the ZigBee network 10 with a certain value (a threshold). As described above, the threshold is a value obtained by adding a prescribed offset value a (e.g. 20) to an upper limit number of the route information (e.g. 40), for example.

If the number of the equipment 200 included in the ZigBee network 10 is the threshold or less (step S11; Yes), the processing unit 122 proceeds with the processing to step S12 and selects the first mode.

On the other hand, if the number of the equipment 200 included in the ZigBee network 10 is more than the threshold (step S11; No), the processing unit 122 proceeds with the processing to step S13 and selects the second mode.

(4.2) The First Mode

After that, a basic operation in the first mode and operation patterns 1 and 2 in case that there is no route information on the equipment 200 to be controlled in the routing table will be described.

(4. 2. 1) The Basic Operation

The HEMS control unit 120 of the HEMS 100 designates the address of the equipment 200 as the transmitting destination node for transmitting to the equipment 200 and performs the transmission request to the ZigBee module 110. In this case, the HEMS control unit 120 sets a timeout period (a timeout period for a response) Ts to the response (response) from the equipment 200.

The ZigBee module 110 of the HEMS 100 refers the own routing table and specifies the route information of the equipment 200. The ZigBee module 110 transmits the data to the equipment 200 based on the route information of the equipment 200.

The ZigBee module 210 of the equipment 200 gives the data addressed to itself gives the equipment control unit 220 according to receiving the data.

The equipment control unit 220 of the equipment 200 gives the response to the data to the ZigBee module 210.

The ZigBee module 210 of the equipment 200 transmits the response received from the equipment control unit 220 to the HEMS 100.

The ZigBee module 110 of the HEMS 100 gives the response addressed to itself to the HEMS control unit 120 according to receiving the response.

In case that timeout occurs because the response (response) is not be able to be acquired within a timeout period for a response TS, the HEMS control unit 120 performs the processing in timeout (e.g. retransmission processing or error determination processing).

(4. 2. 2) The Operation Pattern 1

Figure 5:
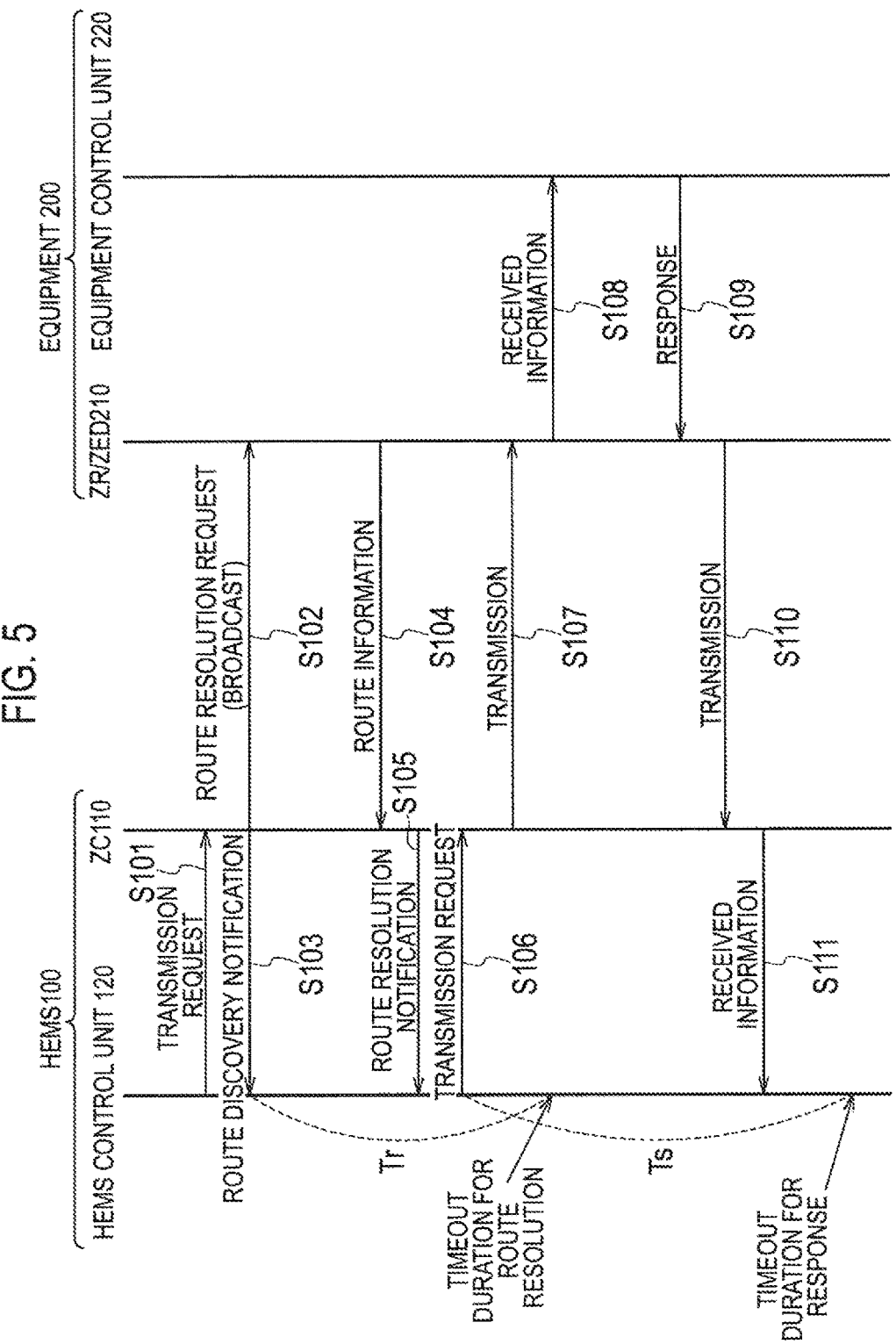
FIG. 5 is an operation sequence diagram of an operation pattern 1 in a first mode according to the present embodiment.

FIG. 5 is the operation sequence diagram of the operation pattern 1 in the first mode. Here, the operational pattern 1 in case that transmission to the equipment 200 to be controlled of which there is no route information in the routing table is performed in the first mode will be described.

As shown in FIG. 5, in step S101, the HEMS control unit 120 of the HEMS 100 designates the address of the equipment 200 as the transmitting destination node for transmitting to the equipment 200 and performs the transmission request to the ZigBee module 110. In this case, the HEMS control unit 120 sets a timeout period TS for the response to the response from the equipment 200.

In step S102, the ZigBee module 110 of the HEMS 100 starts route resolution processing because there is no address of the equipment 200 in the routing table of itself. Specifically, the ZigBee module 110 transmits a route resolution request including the address by broadcast.

In step S103, the ZigBee module 110 of the HEMS 100 notifies the HEMS control unit 120 of starting the route resolution (a route discovery notification). The HEMS control unit 120 aborts the timeout period for the response Ts according the notification from the ZigBee module 110, sets the timeout period for the route resolution Tr, and waits for the route resolution. If the route resolution is not completed within the timeout period for the route resolution Tr, the HEMS control unit 120 sees as the timeout and performs the processing in the timeout.

In step S104, The ZigBee module 210 of the equipment 200 designated as the transmitting destination node transmits history of node which has been passed through in receiving the route resolution request as route information (route information) to the HEMS 100 according to receiving the route resolution request addressed to itself.

In step S105, the ZigBee module 110 of the HEMS 100 notifies the HEMS control unit 120 of completing the route resolution according to receiving the route information of the equipment 200.

In step S106, the HEMS control unit 120 of the HEMS 100 designates the address of the equipment 200 as a transmitting destination node based on the received route information according to confirming the completion of processing of the route resolution and newly performs the transmission request to the ZigBee module 110. In this case, the HEMS control unit 120 newly sets timeout period for a response Ts to the response from the equipment 200.

In step S107, the ZigBee module 110 of the HEMS 100 transmits the data to the equipment 200 based on the route information of the equipment 200 acquired by the processing of the route resolution.

In step S108, the ZigBee module 210 of the equipment 200 gives the data (received information) addressed to itself to the equipment control unit 220 according to receiving the data.

In step S109, the equipment control unit 220 of the equipment 200 gives the response (response) to the data to the ZigBee module 210.

In step S110, the ZigBee module 210 of the equipment 200 transmits the response received from the equipment control unit 220 to the HEMS 100.

In step S111, the ZigBee module 110 of the HEMS 100 gives the response (response information) to the HEMS control unit 120 according to receiving the response addressed to itself.

If the HEMS control unit 120 does not acquire the response from the equipment within the timeout period for the response Ts, the HEMS control unit 120 sees as the timeout and performs the processing in the timeout.

(4. 2. 3) An Operation Pattern 2

Figure 6:
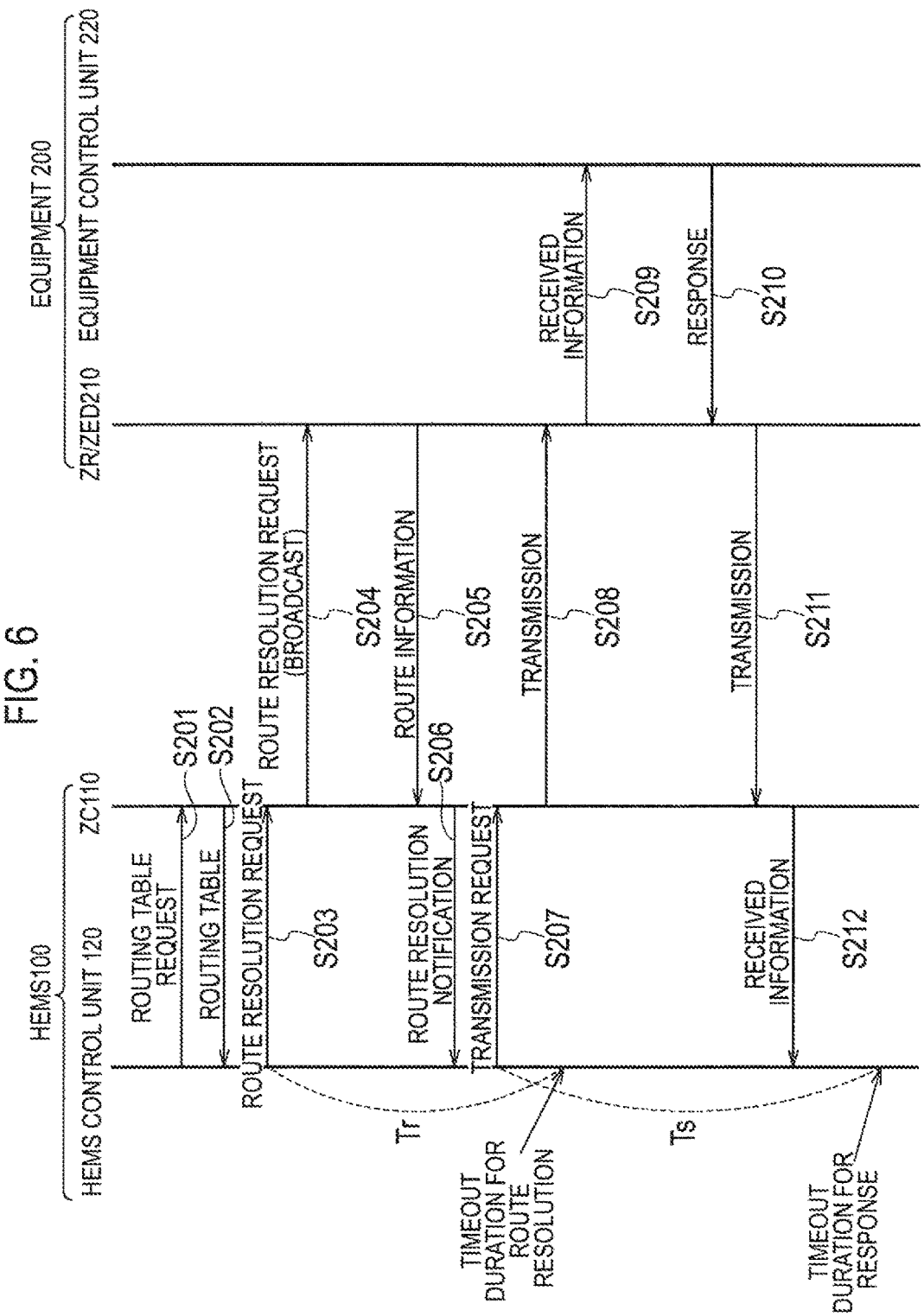
FIG. 6 is an operation sequence diagram of an operation pattern 2 in a first mode according to the present embodiment.

FIG. 6 is an operation sequence diagram of an operation pattern 2 in the first mode. Here, the operation pattern 2 in case that transmission to the equipment 200 to be controlled of which route information does not exist in the routing table will be described.

As shown in FIG. 6, in step S201, the HEMS control unit 120 the HEMS 100 requests the routing table to ZigBee module 110 before the transmission to the equipment 200.

In step S202, the ZigBee module 110 of the HEMS 100 gives the routing table to the HEMS control unit 120. The HEMS control unit 120 may acquire the routing table at transmitting or periodically.

In step S203, the HEMS control unit 120 performs the route resolution request to the ZigBee module 110 because there is no address of the equipment 200 designated as the transmitting destination node in the routing table and sets the timeout period for route resolution Tr.

In step S204, the ZigBee module 110 of the HEMS 100 starts the processing of the route resolution according to the route resolution request from the HEMS control unit 120. Specifically, the ZigBee module 110 transmits the route resolution request including the address of the equipment 200 designated as the transmitting destination node by broadcast.

Operations after step S205 are similar to the operations after step S104 in the operation pattern 1.

(4. 3) The Second Mode

Then, an operation pattern of the second mode will be described.

HEMS control unit 120 acquires entire route information on the entire equipment 200 through the ZigBee module 110 and updates.

When the HEMS 100 transmits to certain equipment 200, the HEMS control unit 120 refers the entire route information on the equipment 200 designated as the transmitting destination node. Then, the HEMS control unit 120 designates the address of the equipment designated as the transmitting destination node and the address of the entire equipment 200 (node) in the halfway route and performs the transmission request to the ZigBee module 110 and sets the t period for a response Ts to the response from the equipment 200 designated as the transmitting destination node.

If the HEMS control unit 120 does not acquire the response from equipment 200 within the timeout period for a response Ts, the HEMS control unit 120 sees as the timeout and performs the processing in the timeout.

(5) A Summary

As described above, the processing unit 122 (application) of the HEMS 100 selects one of either the first mode or the second mode in accordance with the number of the equipment 200 included in the ZigBee network 10. In the first mode, notification of the equipment 200 to be controlled is sent from the processing unit 122 to the ZigBee control unit 112, and the ZigBee control unit 112 controls communication route to the equipment 200. On the other hand, in the second mode, the processing unit 122 decides the communication route to the equipment 200 to be controlled, and notification of the communication route is sent from the processing unit 122 to the ZigBee control unit 112.

In this way, according to the present embodiment, each process for deciding the communication route to the transmitting destination node is different in case that the number of the equipment 200 (node) included in the ZigBee network 10 is large and in case that the number is small. Accordingly, the processing unit 122 is able to select the appropriate mode (route control) in accordance with the number of the equipment 200 (node) included in the ZigBee network 10.

In the present embodiment, when the number of the equipment 200 included in the ZigBee network 10 is equal to or less than a threshold determined in accordance with the upper limit number of the route information capable of being managed (held) by the ZigBee control unit 112, the processing unit 122 selects the first mode. On the other hand, if the first mode is selected when the number of the equipment 200 included in the ZigBee network 10 is large, it takes time to exchange within the network for the route resolution, as a result, there is a problem that time from at starting the transmitting processing of the application to acquiring the response after arriving the destination is over the prescribed timeout (timeout period for a response Ts) of the application.

Accordingly, when the number of the equipment 200 included in the ZigBee network 10 is more than the threshold, the processing unit 122 selects the second mode. Therefore, by the processing unit 122 designating the halfway route, the problem that the prescribed timeout (timeout period for a response Ts) does not make it in time is resolved and the even if the number of the equipment 200 included in the ZigBee network 10 is large, the route control is able to be performed appropriately.

Further, by making the threshold be the value resulting from adding the prescribed offset value a to the upper limit number of the route information, a situation in which a communication traffic volume increases for a small number of the equipment 200 is be able to be avoid. In the second mode, it is necessary for the processing unit 122 to continues to update the entire route information for the grasping the communication route to the entire equipment 200. Therefore, the second mode is appropriate in case that the number of the equipment 200 greatly exceeds, but in case that the number of the slightly exceeds the upper limit number of the route information, continuing to update the entire route information for a small number of the entire route information is not appropriate because the communication traffic volume increases for the updating. Accordingly, by making the threshold be the value resulting from adding the prescribed offset value a to the upper limit number of the route information and selecting the second mode when the threshold is exceeded, the situation in which the communication traffic volume increases for a small number of the equipment 200 is able to be avoided.

In the present embodiment, according to the first mode, in case that the ZigBee control unit 112 performs the route resolution, the processing unit 122 sets the timeout period Tr to fix the term of the route resolution. By making the threshold be the value resulting from adding the prescribed offset value a to the upper limit number of the route information, even if the first mode is selected, the route information on a small number of the equipment 200 does not exist in the routing table. Therefore, in case that the processing unit 122 designates a small number of the equipment 200 as the destination, the ZigBee control unit 112 performs the route resolution before transmitting. Accordingly, by the processing unit 122 setting the timeout period for the route resolution Tr to wait the route resolution, the timeout processing is be able to performed appropriately because more closer time management can be performed.

In the present embodiment, in case that the ZigBee control unit 112 performs the route resolution, when the route resolution is completed within the timeout period for route resolution Tr, the processing unit 122 sets the timeout period for a response Ts to fix the term of the response from the equipment 200. In this way, by the processing unit 122 setting the timeout period for the route resolution Tr to wait the route resolution and the timeout period for a response Ts to wait the response, the timeout processing is be able to performed appropriately because more closer time management can be performed.

(6) Other Embodiments

As described above, the disclosed content of the present invention through exemplary embodiments of the present invention, but the description and drawings which constitute a part of this disclosure should not be understood as limiting the present invention. Various alternative embodiments, examples and operational techniques will be apparent to those skilled in the art from this disclosure.

For example, in the above-described embodiments, the ZigBee protocol is used as the communication protocol to realize the autonomous distributed radio network, but the other communication protocol such as KNX may be used. Also, for example, as the communication protocol such as Echonet Lite is used in the APP layer, a combination of the ZigBee protocol and the other communication protocol may be used.

Further, in the above-described embodiment, the HEMS 100 is described which is a control apparatus for managing power for each home, and the HEMS 100 may be BEMS that manages a building, may be FEMS that manages a factory.

Thus, needless to say, the present invention includes various embodiments and the like not described here. Moreover, it is also possible to combine the above-described embodiments and modifications. Therefore, the technical range of the present invention is to be defined only by the inventive specific matter according to the adequate claims from the above description.

It is noted that the entire content of Japanese Patent Application No. 2012-032145 (filed on Feb. 16, 2012) is incorporated in the present specification by reference.

INDUSTRIAL APPLICABILITY

According to the present invention, it is possible to provide a control apparatus capable of properly performing route control even in the case that the number of equipment included in a radio network is large, and a communication control method.

The invention claimed is:
1. A control apparatus constituting an autonomous distributed radio network with at least one equipment, the control apparatus comprising:
an application processing unit that processes an application to control the equipment, and a communication control unit that manages route information for each of the equipment according to a prescribed communication protocol positioned in a lower layer than the application;

wherein the application processing unit selects one of either a first mode or a second mode in accordance with a number of the equipment included in the radio network by, when the number of the equipment included in the radio network is equal to or less than a threshold determined in accordance with an upper limit number of the route information capable of being managed by the communication control unit, the application processing unit selects the first mode, and, when the number of the equipment included in the radio network is more than the threshold, the application processing unit selects the second mode, wherein, in the first mode, the application processing unit identifies the equipment to be controlled to the communication control unit, and the communication control unit determines a communication route from the control apparatus to the equipment to be controlled, and wherein, in the second mode, the application processing unit determines the communication route from the control apparatus to the equipment to be controlled, and sends the determined communication route to the communication control unit.

2. The control apparatus according to claim 1, wherein the threshold is a value resulting from adding a prescribed offset value to an upper limit number of the route information capable of being managed by the communication control unit.

3. The control apparatus according to claim 2, wherein in the case that the first mode is selected, when the communication control unit does not have the route information corresponding to the equipment to be controlled, the communication control unit performs route resolution to acquire the route information corresponding to the equipment to be controlled, and in the case that the communication control unit performs the route resolution, the application processing unit sets a first timeout period to fix a time limit for the route resolution.

4. The control apparatus according to claim 3, wherein in the case that the communication control unit performs the route resolution, when the route resolution is completed within the first timeout period, the application processing unit performs a transmission request to the equipment to be controlled, to the communication control unit and sets a second timeout period to fix a time limit for a response from the equipment to be controlled.

5. The control apparatus according to claim 3, wherein in the case that the first mode is selected, the application processing unit determines whether the communication control unit has the route information corresponding to the equipment to be controlled, wherein the application processing unit makes the communication control unit perform the route resolution when determined that the communication control unit does not have the route information corresponding to the equipment to be controlled.

6. The control apparatus according to claim 1, wherein the radio network is a ZigBee network.

7. The control apparatus according to claim 1, wherein, in the first mode:

after the application processing unit identifies the equipment to be controlled to the communication control unit, the communication control unit determines whether route information has been stored for the equipment to be controlled;

when route information has not been stored for the equipment to be controlled, the communication control unit performs route resolution to determine a communication route from the control apparatus to the equipment to be controlled; and, when route information has been stored for the equipment to be controlled, the communication control unit determines a communication route from the stored route information for the equipment to be controlled.

8. The control apparatus according to claim 7, wherein, while the communication control unit performs route resolution, the application processing unit maintains a route-resolution timer, and, when the route-resolution timer expires before the communication control unit completes the route resolution, performs timeout processing.

9. The control apparatus according to claim 8, wherein the communication control unit transmits data to the equipment to be controlled according to the determined communication route, and wherein, when the communication control unit transmits the data to the equipment to be controlled, the application processing unit maintains a response timer, and, when the response timer expires before a response is received from the equipment to be controlled, performs timeout processing.

10. The control apparatus according to claim 1, wherein, in the first mode:

the application processing unit receives the route information managed by the communication control unit, and determines whether route information has been stored for the equipment to be controlled;

when route information has not been stored for the equipment to be controlled, the communication control unit performs route resolution to determine a communication route from the control apparatus to the equipment to be controlled; and, when route information has been stored for the equipment to be controlled, the communication control unit determines a communication route based on the stored route information for the equipment to be controlled.

11. The control apparatus according to claim 10, wherein, while the communication control unit performs route resolution, the application processing unit maintains a route-resolution timer, and, when the route-resolution timer expires before the communication control unit completes the route resolution, performs timeout processing.

12. The control apparatus according to claim 11, wherein the communication control unit transmits data to the equipment to be controlled according to the determined communication route, and wherein, when the communication control unit transmits the data to the equipment to be controlled, the application processing unit maintains a response timer, and, when the response timer expires before a response is received from the equipment to be controlled, performs timeout processing.

13. A communication control method applied to a control apparatus constituting an autonomous distributed radio network with at least one equipment, wherein the control apparatus includes an application processing unit processing an application to control the equipment, and a communication control unit managing route information by each of the equipment according to a prescribed communication protocol positioned in a lower layer than the application, the communication control method comprising:

by the application processing unit, selecting one of either a first mode or a second mode in accordance with a number of the equipment included in the radio network by,
- when the number of the equipment included in the radio network is equal to or less than a threshold determined in accordance with an upper limit number of the route information capable of being managed by the communication control unit, selecting the first mode, and,
- when the number of the equipment included in the radio network is more than the threshold, selecting the second mode;

when in the first mode,
- by the application processing unit, identifying the equipment to be controlled to the communication control unit, and,
- by the communication control unit, determining a communication route from the control apparatus to the equipment to be controlled; and, when in the second mode, by the application processing unit, determining the communication route from the control apparatus to the equipment to be controlled, and, sending the determined communication route to the communication control unit.

* * * * *